US005611960A

United States Patent [19]

Torardi et al.

[11] Patent Number: 5,611,960
[45] Date of Patent: Mar. 18, 1997

[54] PROCESS OF PREPARING TANTALATE X-RAY INTENSIFYING PHOSPHORS WITH DECREASED DELAYED FLUORESCENCE

[75] Inventors: Carmine Torardi, Wilmington, Del.; Chwen-Chang R. Miao, Folcroft, Pa.

[73] Assignee: Sterling Diagnostic Imaging, Inc., Glasgow, Del.

[21] Appl. No.: 623,476

[22] Filed: Mar. 28, 1996

[51] Int. Cl.$^6$ ..................................................... C09K 11/67
[52] U.S. Cl. .............................. 252/301.4 R; 250/458.1; 428/690
[58] Field of Search ................. 252/301.4 R; 250/458.1; 428/690

[56] References Cited

U.S. PATENT DOCUMENTS

| | | | |
|---|---|---|---|
| 4,225,653 | 9/1980 | Brixner | 428/539 |
| 4,387,141 | 6/1983 | Patten | 428/690 |
| 4,929,384 | 5/1990 | Reddy | 252/301.4 R |
| 4,929,385 | 5/1990 | Reddy | 252/301.4 R |
| 4,929,386 | 5/1990 | Reddy | 252/301.4 R |
| 4,935,161 | 6/1990 | Reddy et al. | 252/301.4 R |
| 4,938,890 | 7/1990 | Reddy | 252/301.4 R |
| 4,959,174 | 9/1990 | Nakajima et al. | 252/301.6 R |
| 5,064,729 | 11/1991 | Zegarski | 428/690 |
| 5,120,619 | 6/1992 | Nakajima et al. | 428/690 |
| 5,141,673 | 8/1992 | Zegarski | 252/301.4 R |
| 5,154,360 | 10/1992 | Hedden et al. | 241/5 |
| 5,250,366 | 10/1993 | Nakajima et al. | 428/690 |
| 5,310,505 | 5/1994 | Hedden et al. | 252/301.4 R |

OTHER PUBLICATIONS

Brixner, L.H. et al., "On the Structural and Luminescent Properties of the M'LnTaO$_4$ Rare Earth Tantalates," *Chemical Etching Characteristics*, vol. 130, No. 12, pp. 2435–2443, Dec. 1983.

*Primary Examiner*—Melissa Bonner
*Attorney, Agent, or Firm*—Joseph T. Guy, Jr.

[57] ABSTRACT

The delayed fluorescence observable with tantalate phosphors is decreased by the use of a flux composition consisting essentially of 2–95% by weight KCl, 5–98% by weight of at least one lithium salt chosen from a group consisting of LiCl and Li$_2$SO$_4$ and 0–50% by weight of SrCl$_2$.

20 Claims, No Drawings

PROCESS OF PREPARING TANTALATE X-RAY INTENSIFYING PHOSPHORS WITH DECREASED DELAYED FLUORESCENCE

FIELD OF INVENTION

This invention relates to tantalate based intensifying phosphors which luminesce under X-ray excitation. More specifically this invention relates to a method for preparing tantalate based intensifying phosphors which exhibit a superior ability to luminesce under X-ray excitation and exhibit a decreased amount of detrimental delayed fluorescence.

BACKGROUND OF THE INVENTION

X-ray intensifying phosphors are characterized by their ability to absorb X-radiation and to luminesce longer wavelength radiation. The most useful X-ray intensifying phosphors are those which absorb X-radiation and emit, through luminescence, visible or ultraviolet radiation. Medical X-ray intensifying screens represent one commercial application of this phenomenon wherein the screen comprises a phosphor which absorbs the X-radiation and emits an ultraviolet or visible pattern corresponding to the anatomical features of the patient. This imaging process is typically referred to as medical radiography.

The safety of the patient is of utmost concern in the field of medical radiography. In the 100 years since the discovery of diagnostic X-radiation, learned scholars have been seeking advances which will allow for a decrease in the amount of X-radiation exposure required to obtain a diagnostic quality image. Major advances in the art have been achieved. Further improvements are still desired to further decrease the potential effects of patient exposure with ionizing X-radiation.

X-ray phosphors are most commonly prepared by heating phosphor precursors to extremely elevated temperatures in the presence of a flux. The chemical reactions occurring during this process are not well characterized and the art of predicting the solid state reaction chemistry is not well advanced. Therefore, even the most skilled artisan is ill equipped to predict the results one will obtain with variations in the processing procedure.

There are two dominant properties of a phosphor. The first is the ability of the phosphor to absorb X-radiation. The absorption is a function of the atomic number of the chemical elements in the phosphor with larger atomic numbers absorbing more efficiently. The atomic numbers are constant for a given phosphor composition and the process in which the phosphor is prepared does not substantially alter the ability of the phosphor to absorb X-radiation at given particle sizes. A second important property of a phosphor is the ability of the phosphor to convert absorbed X-radiation to ultraviolet or visible light. This is commonly referred to as "conversion efficiency" and the conversion efficiency of a given phosphor is dependent on many parameters most of which are not well understood. It is known that certain impurities and flux compositions can alter the conversion efficiency of a phosphor yet there is no known method of predicting a priori how, or if, the flux composition will effect the conversion efficiency.

One exemplary type of phosphor employed in the art is the family of tantalate phosphors represented by:

(a) $YNb_xTa_{1-x}O_4$, where x is 0 to about 0.15;
(b) $LuNb_xTa_{1-x}O_4$, where x is 0 to about 0.2;
(c) $Y_{1-y}Tm_yTaO_4$, where y is 0 to about 0.03;
(d) $Y_{1-y}Tb_yTaO_4$, where y is about 0.001 to about 0.15;
(e) $Lu_{1-y}Tb_yTaO_4$, where y is about 0.001 to about 0.15;
(f) $Gd_{1-y}Tb_yTaO_4$, where y is about 0.001 to about 0.15;
and various combinations of these tantalate phosphors.

Tantalate phosphors exhibit excellent absorption characteristics due to the incorporation of chemical compounds with large atomic numbers. The conversion efficiency of this class of phosphors is suitable for use in medical diagnostic applications. The applicability of the tantalate phosphors to X-ray intensifying screens was first describe by Brixner in U.S. Pat. No. 4,225,623. The flux composition taught by Brixner comprises $Li_2SO_4$, pure LiCl or a $BaCl_2/LiCl$ eutectic.

Improvements in the conversion efficiency of the tantalate phosphors have been provided. An improved flux composition is provided by Zegarski in U.S. Pat. Nos. 5,064,729 and 5,141,673. These phosphors are based on the use of metasilicates to sequester the generation of alkali metal oxide. The conversion efficiency of the phosphor is improved. Based on the teachings of Zegarski a phosphor composition comprising lithium sulfate should also comprise alkali metal metasilicate. Delayed fluorescence is undesirable in the flux compositions set forth by Zegarski.

The advantages of a LiCl flux, either alone or in combination with $Li_2SO_4$ is detailed in Reddy, U.S. Pat. Nos. 4,938,890; 4,929,384; 4,929,385; 4,929,386 and 4,935,161. These combinations provide improvements in conversion efficiency as illustrated in the examples. Yet, a flux comprising either $LiCl/Li_2SO_4$ or $Li_2SO_4/K_2SO_4$ exhibits a level of delayed fluorescence which is undesirable in a commercial embodiment.

Nakajima, U.S. Pat. No. 5,120,619, describes the use of a flux comprising a divalent metal and an alkali metal to decrease delayed fluorescence. Nakajima does not provide a skilled artisan with teachings which would lead to a systematic approach for the discovery of other materials which would decrease delayed fluorescence.

Described herein is an unexpected flux composition which provides a tantalate phosphor with excellent conversion efficiency and decreased delayed fluorescence.

SUMMARY OF THE INVENTION

It is an object of the present invention to provide an X-ray intensifying phosphor with excellent X-ray absorbance, high conversion efficiency and a minimal amount of delayed fluorescence.

It is another object of the present invention to provide an improved X-ray intensifying screen which comprises a phosphor with a high X-ray absorption, high conversion efficiency and which exhibits a low level of lag or delayed fluorescence.

Provided herein is a process for preparing a tantalate phosphor, and screen, which is particularly well suited for use in medical radiography. The preferred phosphor is chosen from a group consisting of:

(a) $YNb_xTa_{1-x}O_4$, where x is 0 to about 0.15;
(b) $LuNb_xTa_{1-x}O_4$, where x is 0 to about 0.2;
(c) $Y_{1-y}Tm_yTaO_4$, where y is 0 to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15;

(i) a solid solution of at least two of (f), (g) and (h);

(j) any of (a) to (i) wherein up to 45 mole percent of the yttrium, lutetium or gadolinium is replaced by lanthanum;

(k) any of (a) to (i) wherein up to 15 mole percent of the yttrium, lutetium or gadolinium is replaced by ytterbium;

(l) any of (a), (b), (c), (d) and (e) wherein up to 15 mole percent of the yttrium or lutetium is replace by gadolinium; and (m) $Y_{1-x}Bi_xTaO_4$ where x is 0.00005 to about 0.1;

and the phosphor is prepared by a process comprising the steps of:

(i) intimately mixing stoichiometric quantities of corresponding precursor oxides;

(ii) mixing the resultant mixture from (i) with a flux consisting essentially of 2–95% by weight KCl, 5–98% by weight of at least one lithium salt chosen from a group consisting of LiCl and $Li_2SO_4$ and 0–50% by weight of $SrCl_2$;

(iii) heating the flux-containing mixture from (ii) in the range of about 1100° C., to about 1400° C., for at least 3 hours; and (iv) recovering the phosphor.

DETAILED DESCRIPTION OF THE INVENTION

Preparation of the tantalate phosphor is preferably done as described in Brixner U.S. Pat. No. 4,225,653 wherein the M'-monoclinic phase of the tantalate phosphors is described. The preferred M'-monoclinic phosphor has a P2/a space group symmetry. The luminescence of the M'-monoclinic phosphor is typically greater than related materials with an M-monoclinic I2 space group symmetry. Differences in physical characteristics of the M and M'-phase crystals make the two materials easily distinguishable as fully disclosed in Brixner.

The preparation procedure generally consists of blending stoichiometric quantities of the appropriate precursor oxides for the metal incorporated in the phosphor. Preferred precursor oxides include $Ta_2O_5$, $Y_2O_3$, $Gd_2O_3$, $Lu_2O_3$, $Nb_2O_5$, $Tb_2O_3$ and $Tb_4O_7$. This blending may be accomplished in a number of conventional ways. For example, the ingredients may be ball-milled, simply shaken together or preferably subjected to a fluid grinding mill as described by Hedden and Markellos in U.S. Pat. No. 5,154,360. The method of mixing is not limiting provided the method will thoroughly blend the components. The use of a liquid medium to improve the efficiency of the mixing process such as water, fluorochlorinated hydrocarbons or other such inert fluids, may also be incorporated. The oxide mixture is blended with a flux as taught herein. The amount of flux added is preferably about 5 to about 200 wt % based on the total weight of the oxides. Below about 5 wt % the advantages offered with the inventive flux are not readily apparant and above 200 wt % requires more thorough washing to remove the flux. Preferably the amount of flux is about 30 to about 70 wt % based on the total weight of the oxides.

The flux composition of the present invention consist essentially of KCl, at least one lithium salt chosen from $Li_2SO_4$ and LiCl, and optionally, but preferably, $SrCl_2$. The weight percent of the various constituents is based on the total weight of the flux. The composition of the flux is preferably 2–95% by weight KCl. Below 2% KCl the advantage diminishes based on a measure of the delayed fluorescence. Above 95% KCl the flux is not as efficient and it is therefore preferable to include at least 5% by weight of a lithium salt. More preferably the KCl salt is present at a level of 25–75% by weight. The lithium salt is preferably at least one salt chosen from a group consisting of LiCl and $Li_2SO_4$. The amount of lithium salt in the flux is preferably from 5–98% by weight. More preferably the lithium salt is present in the flux in an amount equal to 25–75% by weight. Optionally, and preferably, $SrCl_2$ is added to the flux to increase conversion efficiency. The $SrCl_2$ is preferably present in the flux in an amount equal to 0–50% and more preferably in an amount equal to 0–20% by weight. A most preferred embodiment is represented by a flux consisting essentially of 24–74% by weight KCl, 24–74% by weight of at least one lithium salt chosen from a group consisting of LiCl and $Li_2SO_4$ and 2–15% by weight of $SrCl_2$.

After firing in the conventional manner, flux and soluble reaction products are removed, for example by water leaching. The tantalate phosphor is then recovered and used for the preparation of an X-ray intensifying screen. The mixture of phosphor starting materials can be fired, e.g., for at least about three hours, at elevated temperatures, e.g., from 1100° C., to 1400° C. A preferred temperature range is from 1250° C., to 1300° C. After firing, the mixture is washed to remove the flux and recover the phosphor.

After the intensifying phosphor is made according to the teachings of this invention, the phosphor mixture may be dispersed in any of the commonly known binders, e.g., polyvinyl butyral or the acrylates or methacrylates, using a solvent, e.g., an alcohol, chlorinated hydrocarbon, ketone, butyl acetate, etc. Small amounts of fumed silica may be present in the phosphor to enhance handling and make the phosphor easier to pour. After dispersing in the binder, the phosphor is then cast on a conventional support, e.g., cardboard, polyester film, thin metal sheets, etc. A brightener may also be present within the phosphor and various reflective materials may be present as an underlayer or within the support itself to enhance the generation of light when the phosphor is struck by X-radiation. $TiO_2$ dispersed in a binder and cast on the support is conventional as well as the use of small particles of rutile $TiO_2$ directly in a film support. All of these procedures are well-known in the art. Over the phosphor layer which has been cast on the support, a conventional protective topcoat may be applied and, in fact, is preferred. These topcoats are also well-known in the art and serve to protect the rather expensive phosphor layer from stains and defects during the handling thereof. Conventional supports, binders, mixing and coating processes for the manufacture of typical X-ray intensifying screens are, for example, described in Patten U.S. Pat. No. 4,387,141, the pertinent disclosure of which is incorporated herein by reference thereto.

It is a preferred embodiment to use the intensifying phosphors of this invention in X-ray intensifying screens. The screens may be used in pairs in cooperation with double-side coated medical X-ray silver halide photographic film elements, or they may be used with single-side coated silver halide photographic film elements for some applications. A pair of screens is conventionally used and the phosphor coating weights of each screen may be different, if desired. Thus, an asymmetric pair of screens can be used to get the best results. Medical X-ray evaluations represent the predominant commercial use for X-ray intensifying screens of this invention.

A dimensionally stable, polyethylene terephthalate film support into which small amounts of rutile or anatase titanium dioxide have been incorporated is the preferred support for the x-ray intensifying screen of this invention.

Medical X-ray silver halide films are well known in the art and are commercially available. Conventional films typically comprise a support with a binder coated thereon. The binder contains silver halide grains which are chemically and spectrally sensitized, as known in the art, such that they are most sensitive to the emission of the intensifying screen for which they are intended to be used. Many films are commercially available which will suffice for demonstration of the teachings herein.

Delayed fluorescence is typically observed when exposures are done in a rapid succession. In a medical X-ray examination a problem with delayed fluorescence (or lag) is indicated when a radiograph comprises a primary image as well as a superimposed image corresponding to previous exposures. The observation of lag in a radiographic exposure unit is qualitative and therefore simulation is required to adequately quantify lag for study purposes. The quantitative measurement of lag is accomplished by recording the light emitted from a phosphor (typically incorporated in an X-ray intensifying screen) using a photo multiplier tube. The light emitted during an X-ray excitation is recorded which represents conversion efficiency (or speed). The X-ray excitation is then terminated, and the intensity of the light emitted after a set time is recorded as the delayed fluorescence. The ratio of delayed fluorescence to speed is defined as lag with percent lag frequently reported. To facilitate discussions the speed is reported relative to a standard phosphor such as $CaWO_4$. Alternatively, a practical measure of lag can be obtained by using a silver halide film and screen. In the silver halide film and screen method, a phosphor screen is partially covered with lead to prevent exposure of that portion to x-rays. The screen is then exposed with a very intense x-ray beam using a tungsten anode. Thirty seconds after cessation of the exposure, a film is placed in contact with the screen and held for 4 hours. The film is processed in a conventional manner and the optical density of the film in contact with the exposed part of the screen is compared to the optical density of the film in contact with the unexposed part of the screen. The ratio of optical densities is a measure of the lag or delayed luminescence.

EXAMPLES

The invention will now be illustrated by the following specific examples wherein the percentages and parts are by weight unless otherwise specified.

Preparation Procedure

The general preparation procedure is disclosed in Zegarski U.S. Pat. No. 5,064,729 with the exception of the flux used as indicated in the tables. A stoichiometric mixture of tantalum oxide, yttrium oxide and niobium oxide (if appropriate) were thoroughly blended with the flux indicated in the tables. The flux was typically present in an amount of 50% relative to the total weight of oxide. The mixture was then fired at 1250° C., in air for about 16 hours. The soluble salts were washed from the resultant phosphor with water. After drying, fumed silica was added in an amount equal to about 0.0002 gm of fumed silica per gm of phosphor if necessary to improve the flowability and handling of the resulting phosphor. The phosphor was then dispersed by mechanical shaking or ball milling the phosphor in a carboxylated methyl methacrylate acrylic binder, a mixture of a block copolymer of polyoxyethylene and polypropylene glycol, a plasticizer, and dioctyl sodium sulfosuccinate as a wetting agent, using a solvent mixture of a 1 to 1 weight mixture of n-butyl acetate and n-propanol. This suspension was coated on a support. A preferred support was 0.010 inch (0.25 mm) polyethylene terephthalate with about 5 mg/cm$^2$ $TiO_2$ dispersed therein. The dispersion was coated at substantially constant coating weights for each test set and the effect on speed tested by exposure to a Tungsten X-ray source at 70 kVp and 5 mas or a molybdenum source at about 30 kVp and about 10 mas. Relative speeds are reported versus a $CaWO_4$ control.

Example 1

$YTaO_4$ phosphor, having a M'monoclinic form with a P2/a space group symmetry, was prepared as describe above. The flux is indicated in Table 1. An X-ray intensifying screen was prepared for each phosphor at a constant coating weight. In the following tables wt% refers to the contribution from each component to the total weight of the flux. In all cases 30 Sec %Lag was measured using a photo multiplier tube and 4 Hr %Lag was measured using the silver halide film and screen method.

TABLE 1

| Flux | wt % | Speed | 30 Sec % Lag | |
|---|---|---|---|---|
| $Li_2SO_4$ | 100 | 1.12 | 1.10 | Control |
| $Li_2SO_4/KCl$ | 60/40 | 1.05 | 0.11 | Inventive |
| $Li_2SO_4/LiCl$ | 77/23 | 1.09 | 0.27 | Control |
| $Li_2SO_4/KCl/Li_2SiO_3$ | 69/30/1 | 0.94 | 0.23 | Control |
| $Li_2SO_4/KCl/Li_2SiO_3$ | 84/15/1 | 1.11 | 0.43 | Control |
| $Li_2SO_4/KCl/Li_2SiO_3$ | 97/2/1 | 1.11 | 1.32 | Control |

Example 2

$YTaO_4$ phosphor, having a M'monoclinic form with a P2/a space group symmetry, was prepared as described above with the flux compositions described in Table 2. X-ray intensifying screens were prepared for each phosphor at a constant phosphor coating weight. %Lag was measured at 30 sec. using a photo multiplier tube and 4 Hr. %Lag was measured using the silver halide film and screen method.

TABLE 2

| Flux | Wt % | Speed | 30 Sec % Lag | 4 Hr. % Lag | |
|---|---|---|---|---|---|
| $Li_2SO_4/KCl$ | 50/50 | 1.50 | 0.21 | 0.005 | Inventive |
| $Li_2SO_4/K_2SO_4$ | 50/50 | 1.82 | 0.35 | 0.040 | Control |
| $Li_2SO_4$ | 100 | 1.69 | 0.25 | 0.010 | Control |

Example 3

Various phosphors were prepared as described above using the fluxes indicated in Table 3. %Lag was measured using a photo multiplier tube.

TABLE 3

| Phosphor | Flux | Wt % | Speed | 30 Sec % Lag | |
|---|---|---|---|---|---|
| $YTaO_4$ | $Li_2SO_4$ | 100 | 1.50 | 2.35 | Control |
| $YTaO_4$ | $Li_2SO_4/SrCl_2$ | 95/5 | 1.39 | 0.24 | Control |
| $YTaO_4$ | $Li_2SO_4/SrCl_2$ | 90/10 | 1.40 | 0.20 | Control |
| $YTaO_4$ | $Li_2SO_4/KCl/SrCl_2$ | 57/38/5 | 1.53 | 0.17 | Inventive |
| $YTaO_4$ | $Li_2SO_4/KCl/SrCl_2$ | 54/36/10 | 1.60 | 0.17 | Inventive |
| $YTaO_4$ | $KCl/SrCl_2$ | 90/10 | 0.88 | 0.29 | Control |
| $YNb_{.005}Ta_{.995}O_4$ | $Li_2SO_4$ | 100 | 2.17 | 1.50 | Control |
| $YNb_{.005}Ta_{.995}O_4$ | $Li_2SO_4/SrCl_2$ | 95/5 | 2.60 | 0.14 | Control |
| $YNb_{.005}Ta_{.995}O_4$ | $Li_2SO_4/SrCl_2$ | 90/10 | 2.52 | 0.10 | Control |
| $YNb_{.005}Ta_{.995}O_4$ | $Li_2SO_4/KCl/SrCl_2$ | 57/38/5 | 2.63 | 0.07 | Inventive |
| $YNb_{.005}Ta_{.995}O_4$ | $Li_2SO_4/KCl/SrCl_2$ | 54/36/10 | 2.48 | 0.07 | Inventive |
| $YNb_{.005}Ta_{.995}O_4$ | $KCl/SrCl_2$ | 90/10 | 1.18 | 0.20 | Control |
| $YNb_{.02}Ta_{.98}O_4$ | $Li_2SO_4$ | 100 | 1.88 | 0.20 | Control |
| $YNb_{.02}Ta_{.98}O_4$ | $Li_2SO_4/SrCl_2$ | 95/5 | 2.29 | 0.09 | Control |
| $YNb_{.02}Ta_{.98}O_4$ | $Li_2SO_4/SrCl_2$ | 90/10 | 2.25 | 0.68 | Control |
| $YNb_{.02}Ta_{.98}O_4$ | $Li_2SO_4/KCl/SrCl_2$ | 57/38/5 | 2.37 | 0.06 | Inventive |
| $YNb_{.02}Ta_{.98}O_4$ | $Li_2SO_4/KCl/SrCl_2$ | 54/36/10 | 2.35 | 0.07 | Inventive |
| $YNb_{.02}Ta_{.98}O_4$ | $KCl/SrCl_2$ | 90/10 | 2.25 | 0.08 | Control |

The experimental data clearly illustrates that the inventive flux composition provides a phosphor with a decreased lag relative to the previously available flux compositions. Furthermore, when $SrCl_2$ is included in the flux composition the lag remains low and the conversion efficiency (reported as speed) is superior to the previously available flux compositions.

We claim:

1. A process for preparing an X-ray intensifying phosphor chosen from a group consisting of:

(a) $YNb_xTa_{1-x}O_4$, where x is 0 to about 0.15;

(b) $LuNb_xTa_{1-x}O_4$, where x is 0 to about 0.2;

(c) $Y_{1-y}Tm_yTaO_4$, where y is 0 to about 0.03;

(d) a solid solution of (a) and (b);

(e) a solid solution of (a) and (c);

(f) $Y_{1-y}Tb_yTaO_4$, where y is about 0.001 to about 0.15;

(g) $Lu_{1-y}Tb_yTaO_4$, where y is about 0.001 to about 0.15;

(h) $Gd_{1-y}Tb_yTaO_4$, where y is about 0.001 to about 0.15;

(i) a solid solution of at least two of (f), (g) and (h);

(j) any of (a) to (i) wherein up to 45 mole percent of the yttrium, lutetium or gadolinium is replaced by lanthanum;

(k) any of (a) to (i) wherein up to 15 mole percent of the yttrium, lutetium or. gadolinium is replaced by ytterbium;

(l) any of (a), (b), (c), (d) and (e) wherein up to 15 mole percent of the yttrium or lutetium is replaced by gadolinium; and (m) $Y_{1-x}Bi_xTaO_4$ where x is 0.00005 to about 0.1;

said process comprising the steps:

(i) intimately mixing stoichiometric quantities of corresponding precursor oxides;

(ii) mixing the resultant mixture from (i) with a flux consisting essentially of 2–95% by weight KCl, 5–98% by weight of at least one lithium salt chosen from a group consisting of LiCl and $Li_2SO_4$ and 0–50% by weight of $SrCl_2$;

(iii) heating the flux-containing mixture from (ii) in the range of about 1100° C to about 1400° C., for at least 3 hours; and (iv) recovering the phosphor.

2. The process for preparing an X-ray intensifying phosphor of claim 1 wherein said flux consist essentially of 25–75% by weight KCl, 25–75% by weight of at least one lithium salt chosen from the group consisting of LiCl and $Li_2SO_4$ and 0–20% by weight of $SrCl_2$.

3. The process for preparing an X-ray intensifying phosphor of claim 2 wherein said flux consist essentially of 25–75% by weight KCl and 25–75% by weight of at least one lithium salt chosen from the group consisting of LiCl and $Li_2SO_4$.

4. The process for preparing an X-ray intensifying phosphor of claim 2 wherein said flux consist essentially of 24–74% by weight KCl, 24–74% by weight of at least one lithium salt chosen from a group consisting of LiCl and $Li_2SO_4$ and 2–15% by weight of $SrCl_2$.

5. The process for preparing an X-ray intensifying phosphor of claim 1 wherein said phosphor is chosen from the group consisting of:

(a) $YNb_xTa_{1-x}O_4$, where x is 0 to about 0.15;

(b) $LuNb_xTa_{1-x}O_4$, where x is 0 to about 0.2;

(c) $Y_{1-y}Tm_yTaO_4$, where y is 0 to about 0.03;

(d) a solid solution of (a) and (b);

(e) a solid solution of (a) and (c);

(f) $Y_{1-y}Tb_yTaO_4$, where y is about 0.001 to about 0.15;

(g) $Lu_{1-y}Tb_yTaO_4$, where y is about 0.001 to about 0.15;

(h) $Gd_{1-y}Tb_yTaO_4$, where y is about 0.001 to about 0.15;

(i) a solid solution of at least two of (f), (g) and (h);

(j) any of (a) to (i) wherein up to 45 mole percent of the yttrium, lutetium or gadolinium is replaced by lanthanum;

(k) any of (a) to (i) wherein up to 15 mole percent of the yttrium, lutetium or gadolinium is replaced by ytterbium; and (l) any of (a), (b), (c), (d) and (e) wherein up to 15 mole percent of the yttrium or lutetium is replaced by gadolinium.

6. The process for preparing an X-ray intensifying phosphor of claim 5 wherein said phosphor is chosen from the group consisting of:

(a) $YNb_xTa_{1-x}O_4$, where x is 0 to about 0.15; and (b) $LuNb_xTa_{1-x}O_4$, where x is 0 to about 0.2.

7. The process for preparing an X-ray intensifying phosphor of claim 1 wherein said phosphor is an M'-monoclinic phosphor with a P2/a space group symmetry.

8. A process for preparing an X-ray intensifying phosphor chosen from a group consisting of:

(a) $YNb_xTa_{1-x}O_4$, where x is 0 to about 0.15;
(b) $LuNb_xTa_{1-x}O_4$, where x is 0 to about 0.2;
(c) $Y_{1-y}Tm_yTaO_4$, where y is 0 to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15;
(i) a solid solution of at least two of (f), (g) and (h);
(j) any of (a) to (i) wherein up to 45 mole percent of the yttrium, lutetium or gadolinium is replaced by lanthanum;
(k) any of (a) to (i) wherein up to 15 mole percent of the yttrium, lutetium or gadolinium is replaced by ytterbium; and
(l) any of (a), (b), (c), (d) and (e) wherein up to 15 mole percent of the yttrium or lutetium is replaced by gadolinium;

said process comprises the steps:
(i) intimately mixing stoichiometric quantities of corresponding precursor oxides;
(ii) mixing the resultant mixture from (i) with a flux consisting essentially of 2–95% by weight KCl, 5–98% by weight of at least one lithium salt chosen from a group consisting of LiCl and $Li_2SO_4$ and 0–50% by weight of $SrCl_2$;
(iii) heating the flux-containing mixture from (ii) in the range of about 1100° C., to about 1400° C., for at least 3 hours; and
(iv) recovering the phosphor.

9. The process for preparing an X-ray intensifying phosphor of claim 8 wherein said flux consist essentially of 25–75% by weight KCl, 25–75% by weight of at least one lithium salt chosen from the group consisting of LiCl and $Li_2SO_4$ and 0–20% by weight of $SrCl_2$.

10. The process for preparing an X-ray intensifying phosphor of claim 9 wherein said flux consist essentially of 25–75% by weight KCl and 25–75% by weight of at least one lithium salt chosen from the group consisting of LiCl and $Li_2SO_4$.

11. The process for preparing an X-ray intensifying phosphor of claim 8 wherein said flux consist essentially of 24–74% by weight KCl, 24–74% by weight of at least one lithium salt chosen from a group consisting of LiCl and $Li_2SO_4$ and 2–15% by weight of $SrCl_2$.

12. The process for preparing an X-ray intensifying phosphor of claim 8 wherein said phosphor is chosen from the group consisting of:
(a) $YNb_xTa_{1-x}O_4$, where x is 0 to about 0.15; and
(b) $LuNb_xTa_{1-x}O_4$, where x is 0 to about 0.2.

13. The process for preparing an X-ray intensifying phosphor of claim 8 wherein said phosphor is an M'-monoclinic phosphor with a P2/a space group symmetry.

14. A radiographic recording element comprising an X-ray intensifying screen wherein said X-ray intensifying screen comprises:
a support and an active layer;
said active layer comprises a binder and at least one phosphor chosen from a group consisting of:

(a) $YNb_xTa_{1-x}O_4$, where x is 0 to about 0.15;
(b) $LuNb_xTa_{1-x}O_4$, where x is 0 to about 0.2;
(c) $Y_{1-y}Tm_yTaO_4$, where y is 0 to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15;
(i) a solid solution of at least two of (f), (g) and (h);
(j) any of (a) to (i) wherein up to 45 mole percent of the yttrium, lutetium or gadolinium is replaced by lanthanum;
(k) any of (a) to (i) wherein up to 15 mole percent the yttrium, lutetium or gadolinium is replaced by ytterbium;
(l) any of (a), (b), (c), (d) and (e) wherein up to 15 mole percent of the yttrium or lutetium is replaced by gadolinium; and
(m) $Y_{1-x}Bi_xTaO_4$ where x is 0.00005 to about 0.1;

and said at least one phosphor is prepared by a process comprising the steps:
(i) intimately mixing stoichiometric quantities of corresponding precursor oxides;
(ii) mixing the resultant mixture from (i) with a flux consisting essentially of 2–95% by weight KCl, 5–98% by weight of at least one lithium salt chosen from a group consisting of LiCl and $Li_2SO_4$ and 0–50% by weight of $SrCl_2$;
(iii) heating the flux-containing mixture from (ii) in the range of about 1100° C., to about 1400° C., for at least 3 hours; and
(iv) recovering the phosphor.

15. The radiographic recording element of claim 14 wherein said flux consist essentially of 25–75% by weight KCl, 25–75% by weight of at least one lithium salt chosen from the group consisting of LiCl and $Li_2SO_4$ and 0–20% by weight of $SrCl_2$.

16. The radiographic recording element of claim 15 wherein said flux consist essentially of 25–75% by weight KCl and 25–75% by weight of at least one lithium salt chosen from the group consisting of LiCl and $Li_2SO_4$.

17. The radiographic recording element of claim 15 wherein said flux consist essentially of 24–74% by weight KCl, 24–74% by weight of at least one lithium salt chosen from the group consisting of LiCl and $Li_2SO_4$ and 2–15% by weight of $SrCl_2$.

18. The radiographic recording element of claim 14 wherein said phosphor is chosen from the group consisting of:
(a) $YNb_xTa_{1-x}O_4$, where x is 0 to about 0.15; and
(b) $LuNb_xTa_{1-x}O_4$, where x is 0 to about 0.2.

19. The radiographic recording element of claim 14 wherein said radiographic recording element further comprises a silver halide film.

20. The radiographic recording element of claim 14 wherein said phosphor is is a M'-monoclinic phosphor with a P2/a space group symmetry.

* * * * *